(12) United States Patent
Lehmann et al.

(10) Patent No.: US 9,415,543 B2
(45) Date of Patent: Aug. 16, 2016

(54) BONDING OBJECTS TOGETHER

(71) Applicant: Woodwelding AG, Stansstad (CH)

(72) Inventors: Mario Lehmann, Les Pommerats (CH); Jörg Mayer, Niederlenz (CH)

(73) Assignee: WOODWELDING AG, Stansstad (CH)

( * ) Notice: Subject to any disclaimer, the term of this patent is extended or adjusted under 35 U.S.C. 154(b) by 0 days.

(21) Appl. No.: 14/649,399

(22) PCT Filed: Dec. 2, 2013

(86) PCT No.: PCT/CH2013/000207
§ 371 (c)(1),
(2) Date: Jun. 3, 2015

(87) PCT Pub. No.: WO2014/085942
PCT Pub. Date: Jun. 12, 2014

(65) Prior Publication Data
US 2015/0306817 A1    Oct. 29, 2015

Related U.S. Application Data

(60) Provisional application No. 61/733,497, filed on Dec. 5, 2012.

(51) Int. Cl.
*B32B 37/00* (2006.01)
*B29C 65/00* (2006.01)
(Continued)

(52) U.S. Cl.
CPC ............ *B29C 66/7392* (2013.01); *B29C 65/08* (2013.01); *B29C 65/486* (2013.01); *B29C 65/4815* (2013.01); *B29C 65/542* (2013.01); *B29C 65/645* (2013.01); *B29C 66/1122* (2013.01); *B29C 66/1142* (2013.01); *B29C 66/12441* (2013.01); *B29C 66/12463* (2013.01);
(Continued)

(58) Field of Classification Search
CPC .... B29C 66/7392; B29C 65/06; B29C 65/08; B29C 65/645; B29C 65/727
USPC ................. 156/73.1, 73.5, 73.6, 580.1, 580.2
See application file for complete search history.

(56) References Cited

U.S. PATENT DOCUMENTS 4,854,993 A     8/1989  Celia
7,160,405 B2 *  1/2007  Aeschlimann ........ B29C 65/562
                                                      156/298
(Continued)

FOREIGN PATENT DOCUMENTS

EP    0 187 358    7/1986
EP    2 520 419    11/2012
(Continued)

*Primary Examiner* — James Sells
(74) *Attorney, Agent, or Firm* — Rankin, Hill & Clark LLP

(57) ABSTRACT

A second object, which includes a thermoplastic material, is bonded to a first object, which includes a first object material having an at least partially cross-linked polymer not miscible with the thermoplastic material. The method includes the steps of pressing the second object against the first object and coupling energy into the second object until the thermoplastic material is at least partially liquefied and the first object material in a vicinity of an interface to the thermoplastic material is above its glass transition temperature, and until the thermoplastic material is caused to penetrate into at least one of cracks, pores and deformations of the first object material, and letting the thermoplastic material re-solidify.

32 Claims, 8 Drawing Sheets

(51) Int. Cl.
  *B29C 65/08* (2006.01)
  *B29C 65/48* (2006.01)
  *B29C 65/54* (2006.01)
  *B29C 65/64* (2006.01)
  *B29L 31/00* (2006.01)

(52) U.S. Cl.
  CPC ..... *B29C 66/30221* (2013.01); *B29C 66/30223* (2013.01); *B29C 66/30326* (2013.01); *B29C 66/472* (2013.01); *B29C 66/474* (2013.01); *B29C 66/5344* (2013.01); *B29C 66/727* (2013.01); *B29C 66/7394* (2013.01); *B29C 66/73753* (2013.01); *B29C 66/7487* (2013.01); *B29C 66/81425* (2013.01); *B29C 66/8322* (2013.01); *B29C 66/91411* (2013.01); *B29C 66/91943* (2013.01); *B29C 66/92445* (2013.01); *B29C 66/92921* (2013.01); *B29C 66/9516* (2013.01); *B29C 66/9592* (2013.01); *B29C 66/12461* (2013.01); *B29C 66/9513* (2013.01); *B29C 66/9517* (2013.01); *B29L 2031/737* (2013.01)

(56) References Cited

U.S. PATENT DOCUMENTS

| | | | | |
|---|---|---|---|---|
| 8,225,479 | B2* | 7/2012 | Clinch | B29C 66/43421 29/505 |
| 8,528,299 | B2* | 9/2013 | Cove | B29C 65/08 52/376 |
| 8,550,759 | B2* | 10/2013 | Clinch | F16B 5/01 156/73.1 |
| 8,950,159 | B2* | 2/2015 | Cove | B29C 65/08 52/376 |

FOREIGN PATENT DOCUMENTS

| | | |
|---|---|---|
| WO | 98/42988 | 10/1998 |
| WO | 00/79137 | 12/2000 |

* cited by examiner

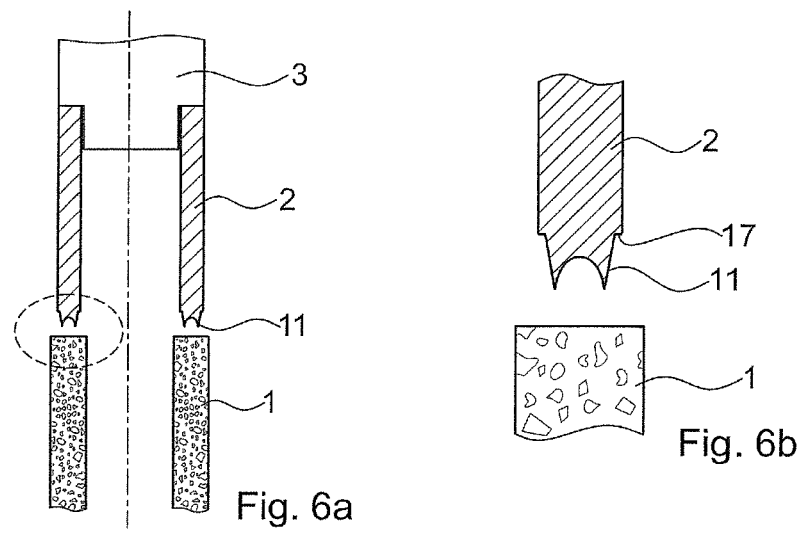
Fig. 6a
Fig. 6b
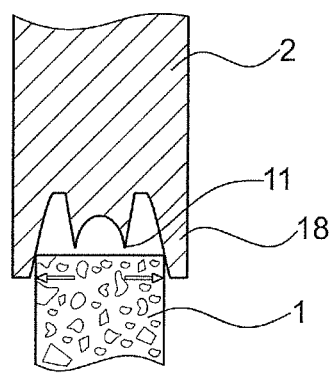
Fig. 6c

BONDING OBJECTS TOGETHER

BACKGROUND OF THE INVENTION

1. Field of the Invention

The invention is in the field of bonding objects together in construction, engineering, building industry, medical technology, materials science etc. Especially, the method relates to bonding together polymer-based objects including polymers that are not compatible and do not alloy.

2. Description of Related Art

It is often difficult to bond objects of polymer materials if not all of the three conditions "the polymers of the objects are thermoplastic", "the polymers melt at similar temperatures" and "the polymers are miscible" are met. In many cases, auxiliary elements such as screws, clamps, mounting etc. are needed, which bond the objects together.

SUMMARY OF THE INVENTION

It is an object of the present invention to provide a method of bonding objects of polymer materials together, which methods overcomes drawbacks of prior art methods and allows the bonding of objects together for which bonding was difficult so far.

It is another object of the invention to provide a method of bonding objects together, which method is economical and fast.

It is yet another object of the invention to provide a method of bonding objects together, which method provides a good sealing between the objects.

According to an aspect of the invention, a second object is bonded to a first object. The second object comprises a thermoplastic material, and the first object comprises a first object material comprising an at least partially cross-linked polymer or pre-polymer with elastomeric properties. The method comprises the steps of:

pressing the second object against the first object and coupling energy into the second object until the thermoplastic material is at least partially liquefied while the first object material, in a vicinity of an interface to the thermoplastic material, is above its glass transition temperature, and until the thermoplastic material is caused to penetrate into at least one of cracks, pores and deformations of the first object material, and letting the thermoplastic material re-solidify.

In this, the first object material may be porous or non-porous. If it is porous, it may have open pores or closed pores. The percentage of the overall volume of pores in relation to the total volume may be between 0% and 60%, in certain special cases even higher. Embodiments of the method are especially suited for first object materials that also above their glass transition temperature offer a certain resistance against mechanical deformation, often this is the case if the total volume of possible pores is not higher than 40% or not higher than 30% or 20%.

The first object material may be such that it is above its glass transition temperature already at room temperature, or it may be chosen so that it is brought above its glass transition temperature at least locally by the energy coupled into the second object and absorbed directly or indirectly (via heating of the second object) in the first object material.

The at least partially cross-linked polymer of the first object may optionally be a matrix of a first object material that further includes a filler.

The cross-linking of the first object material may be a chemical cross-linking or a physical cross linking, a condition being that the first object material maintains a shape memory throughout the process.

The first object may consist of the first object material or may include in addition to portions of the first object material further portions of different materials connected to the first object material. In an example, such further portions are weldable to the thermoplastic polymer or are capable of being interpenetrated by the thermoplastic polymer in a manner that after re-solidification of the thermoplastic polymer a positive fit connection results, for example as taught in in WO 98/42988 and WO 00/79137.

Examples of first object materials comprise Poly-Urethanes (PU), Poly-Butadien, fluorinated Elastomers, chlorinated Elastomers, Silicone rubber; in combination with appropriate thermoplastic materials of the second object (see below) also epoxides and cross-linked polyesters with glass transition temperatures of for example between 150° C. and 250° C.

The thermoplastic material of the second object may consist of a thermoplastic polymer or may include, in addition to the thermoplastic polymer, further phases such as a filler. Specific embodiments of materials are polyethylene, polypropylene, polyamides, for example Polyamide 12, Polyamide 11, Polyamide 6, or Polyamide 66, Polyoxymethylene, polycarbonateurethane, polycarbonates or polyester carbonates, acrylonitrile butadiene styrene (ABS), Acrylester-Styrol-Acrylnitril (ASA), Styrene-acrylonitrile, polyvinyl chloride, polystyrene, or Polyetherketone (PEEK), Polyetherimide (PEI), Polysulfon (PSU), Poly(p-phenylene sulfide) (PPS), Liquid crystall polymers (LCP) etc. The latter group including PEEK, PEI, PSU, PPS, and LCP comprises material with a relatively high melting point; such materials are particularly suited for bonding to first object materials with a comparably high glass transition temperature, such as materials of the epoxide system. LCPs are of particular interest since their sharp drop in viscosity during melting enables them to penetrate in very fine cracks and pores.

A preferred condition for a material pairing of a first object material and a thermoplastic material (of the second object) fulfills the condition $T_{fl,2} > T_{G,1}$, where $T_{fl,2}$ is a temperature above which the thermoplastic material is flowable, and $T_{G,1}$ is the glass transition temperature of the first object material. For crystalline thermoplastics, $T_{fl,2}$ corresponds to the melting point $T_m$, whereas for amorphous thermoplastics, $T_{fl,2}$ may be defined to be $T_{fl,2} = T_{G,2} + 50°$, where $T_G$ is the glass transition point of the thermoplastic material. Alternatively, in amorphous thermoplastics—or generally in thermoplastics, $T_{fl,2}$ may be defined by a certain minimum flowability, or to be more precise, minimum fluidity as defined by the temperature at which according to the melt flow index of the polymer the material can be processed by injection molding or extrusion.

Generally, the glass transition temperature (or glass transition point) and the melting temperature (or melting point) of the herein discussed materials are to be understood as defined in accordance with the relevant standards, especially, the ISO standards, such as of the ISO 11357 group (as valid in 2012).

Generally, the first object material and the thermoplastic material that interpenetrates the first object material are chosen so that they are not miscible (i.e. are not solvable in each other and do not alloy) and do not undergo any chemical bonding with each other.

The energy coupled into the second object may be mechanical vibration energy, in particular ultrasonic vibration. The vibration is coupled into the second object from the proximal side (the side facing away from the bonding side that is brought into contact with the first object). To this end, the proximal side of the second object may have an incoupling surface, for example a flat surface. The vibration is coupled into the second object from a tool (sonotrode) with a, for example, correspondingly adapted distal surface.

As an alternative, the vibration may be coupled indirectly into the second object, for example via a further, third object that optionally by the process may be connected to the first and second object. In accordance with a first possibility, such a third object may have a cavity with an undercut, wherein molten and then re-solidified material of the second object fills the cavity. In accordance with a second possibility, such a third object may include a structure with pores or in which pores are generatable by a liquid under hydrostatic pressure, into which pores the material of the second object penetrates. In accordance with an even further, third possibility such a third object may include material that is capable of being welded to the material of the second object. As an even further alternative, such a third object may have similar properties as the first object and thus also have elastomeric properties and be above the glass transition temperature at the temperature at which the thermoplastic material of the second object melts.

Mechanical vibration or oscillation suitable for devices and methods according to aspects of the invention has preferably a frequency between 2 and 100 kHz (even more preferably between 10 and 70 kHz, or between 14 and 35 kHz, whereas for coatings or parts wherein the bonding zone is in the near-field, also higher frequencies of for example between 40-60 kHz—depending on the size of the objects may be advantageous) and a vibration energy of 0.5 to 30 W or between 2 W and 20 W per square millimeter of active surface. The tool (for example sonotrode) is, for example, designed such that its contact face oscillates predominantly in the direction perpendicular to the contact face (longitudinal vibration) and with an amplitude of between 5 and 150 μm, preferably around 20 to 100 μm, for example between 35 and 70 μm; generally with higher working frequencies, smaller amplitudes are required. Rotational oscillation is possible also.

An alternative energy source is electromagnetic radiation. Especially, the second object may be transparent for electromagnetic radiation in a certain frequency range (for example, visible or near infrared) at least in parts, and the first and/or the second object may be configured to absorb this electromagnetic radiation in a vicinity of the interface between the first and second objects.

Aspects of the invention are based on the insight that an at least partially cross-linked material above its glass transition temperature has elastomeric properties and, when put under mechanical load (such as by vibrations) and/or when pierced may be caused to develop cracks or other surface feature deviating from a smooth surface. In addition, such a material may optionally have pre-existing structures, for example open pores or closed pores that may be laid open by the features of the second object penetrating into the first object. Flowable thermoplastic material may penetrate into these cracks, pores or other structures and thereby seal the interface between the first and second objects. At the same time, the interpenetration of these structures by the thermoplastic material after the re-solidification of the thermoplastic material yields an interlocking of the first and second objects on a small (microscopic) scale, and/or on a macroscopic scale. This interlocking provides a mechanical positive-fit connection between the phases.

In this, the thermoplastic material that has interpenetrated the structures under (directed and/or hydrostatic) pressure may have locally caused a permanent deformation of the first object material. Because this material is at least partially cross-linked, it will still have a shape memory and thus a tendency to return to its original shape. The deformation brought about by the introduction of a feature/or material of the second object—that may be viewed as an elasto-plastic deformation—thus causes the first object material to remain under some stress. This may be used to yield an additional— in addition to the interlocking of the phases—stabilization and/or sealing by the first object material being pressed against a surface part of the second object.

In a first option, the first object material is above its glass transition temperature not only during the bonding process but also at a temperature of use. Then, it will remain elastomeric during use.

In a second option, the first object material is below its glass transition temperature at a temperature of use (for example room temperature). Then, the deformation brought about by the bonding process will be 'frozen'.

Embodiments in accordance with the second option bring about a further possibility. The first object may optionally be provided in a state in which the surface is under stress, such as residual compressive stress. Then, upon heating the first object above the glass transition temperature, the stress will be released. This may be used to support the sealing or bonding. For example, the first object material may comprise pre-defined bonding structures that are however covered up by frozen structure under stress. As a first example, the first object may be provided with a covered-up bore with retention structures. As second example, the first object may be of a closed-pore material with a cold formed (cold worked) surface that in the frozen state is optically dense. Upon local insertion of the second object and local heating coming about with this, the pores open, and the liquefied thermoplastic material of the first object may penetrate into the pores and thereby (additionally) stabilize the connection.

The second object my comprise a bonding surface to interface with a corresponding surface portion of the first object, with one or more protruding features arranged to be advanced into the first object material during the bonding process, i.e. protruding from a hypothetical surface parallel to the surface portion of the first object. Such features may according to an option be formed similarly to energy directors known from ultrasonic welding—with same dimensions or on a larger scale.

Protruding features may especially have the shapes of tips or ridges. They may have a piercing pointed end or edge capable of locally being driven through the surface (i.e. to not only elastically deform the first object material but to rupture the material locally), prior to the energy source being turned on or assisted by the effect, especially of mechanical vibrations.

Such protruding features may have one or both of the following effects:
  Because of their structure, they ease the generation of a local rupture and of cracks or the like that may then be penetrated by liquefied thermoplastic material;
  Because of their structure they serve as energy directors defining locations where mechanical energy is predominantly absorbed and transferred into heat, both, in the thermoplastic material and in the first object material. The former, by the relative movement, produces a film of molten thermoplastic material that may seal the interface between the first and second objects and thereby heals the ruptures/cracks.

Instead of including a protruding feature, the second object may as a whole be elongate and have a tip or edge that may be pressed into the second object; the above considerations about the shape and function of the protruding features apply also for this shape.

From WO 98/42988 and WO 00/79137, a method of anchoring a connecting element in a porous material, such as wood, is known, which method includes pressing an element with liquefiable (thermoplastic) material against the porous material until the thermoplastic material is at least partially liquefied and pressed into the pores of the porous material so that after re-solidification an anchoring results. In contrast to the approaches described in these publications, the claimed method according to aspects of the present invention includes anchoring in—porous or not porous—at least partially cross-linked material above its glass transition temperature. This has the following effects:

If the energy input is done by mechanical vibrations, the first object material vibrates, too, and absorbs energy due to internal friction. This will generate heat that may contribute to the liquefaction of the thermoplastic material.

The first object material undergoes both, elastic deformation and irreversible deformation (such as by cracks formed in the material).

The elastic deformation will cause the first object material to remain under stress even after the bonding process. This is in contrast to what is described in WO 98/42988 and WO 00/79137, where no such stress occurs because none of the involved materials is elastically deformed and thus the system is in a mechanic equilibrium after the energy input has ended.

The cracks or other distortions in the first object material are capable of being filled by the thermoplastic material, and this will yield an anchoring after the re-solidification. Due to the elasticity of the first object material during the process (i.e. because it is above its glass transition temperature), the cracks will remain local, however, i.e. there is no risk that the process will process cracks destroying the first object. Especially, the first object material and the thermoplastic material may be chosen so that the polymer, due to the first-order (melting) transition, undergoes a much higher thermal shrinkage than the first object material when cooled down to room temperature so that there will be little tendency of the cracks to progress after the cooling. Also, as the first object material will often be heated only locally during the process, the first object material portions that are further away and have remained cold will cause a compression of the first object material in a vicinity of the interpenetrated regions; and this also prevents the cracks from growing.

It may be (this holds for all embodiments) advantageous if the materials are chosen so that the thermal expansion during the process is larger for the thermoplastic material than for the first object material.

Due to the stress under which the first object material remains after the process, there can be a constant pressure on the surface of the second object. This yields a high potential for a sealing bond, even though the materials are not miscible and form a well-defined interface between them. The sealing effect comes about both, by a labyrinth-type sealing because of the interpenetration of the structures by the thermoplastic material, and by the first object material being locally pressed against the surface of the second object.

The method may optionally comprise the following optional features and/or steps:

During the step of pressing the second object against the first object, at least one portion of the second object may be caused to penetrate into the first object material, in a manner, that the first object material is locally ruptured. This may for example be achieved by the above-discussed protruding features. Alternatively, the second object as a whole may be elongate or ridge-shaped, a distal portion then being pressed into the first object material.

In embodiments having the above-discussed feature, a surface portion of the second object or of a protruding feature thereof may be different from cylindrical and may be pointed and for example concave. This brings about the advantage that the first object material portions that are parted by the second object or protruding feature thereof are, by elastic forces within the first material, still pressed against the second object.

The second object or at least one protruding feature thereof may be provided with a broadened portion and, proximally thereof, with a neck portion, a radial extension of which is at least in one direction smaller than a corresponding radial extension of the broadened portion so that after introduction into the first object material—that has elastic properties—an undercut arises yielding a further, macroscopic positive-fit connection.

The method may comprise the step of maintaining a pressing force after the step of coupling energy into the second object (and thus while the thermoplastic material re-solidification sets in). This is an option for all embodiments of the invention; it may especially be advantageous in situations where no macroscopic undercut assists primary stabilization and/or in situations in which the first object material becomes comparably soft and pasty during the process and offers little resistance.

The second object may include a body of a non-liquefiable material in addition to the thermoplastic material. Non-liquefiable materials in this context are materials that remain dimensionally stable under the conditions that arise during the process. Examples of non-liquefiable materials are metals, thermoset plastics, ceramics, and thermoplastics with melting temperatures far above the melting temperature of the thermoplastic material.

The body of the non-liquefiable material may, for example, constitute a core or core portion of the second object and be fully or locally coated by the thermoplastic material.

Alternatively, the body may include a cannulation open to the proximal side, the cannulation connected to openings into the bonding surface, wherein a thermoplastic element that includes the thermoplastic material is inserted or insertable in the cannulation and pressed, under the impact of energy, into the cannulation until portions of the thermoplastic material are liquefied and pressed out of the openings into the first object material while the second object is pressed against the first object.

The second object may be composed of several object parts, for example object parts that are initially movable relative to one another and that are welded or mechanically connected to each other by re-solidified molten material of the thermoplastic material;

The first object material may be chosen to be only partially cross-linked prior to the bonding process, and in the step of coupling energy into the second object, the first object material, due to the heat absorbed directly and/or from the second object, is caused to be further cross-linked. This may provide additional stability after the bonding process. For example, the first object material may even be chosen so that the glass transition temperature during the step of coupling energy into the second object or shortly thereafter rises above the temperature at which the thermoplastic material becomes flowable. Then, the structure that is present during the process is frozen with high mechanical stability.

The first object material may be provided, either in the original shaping process or in a later material removing processing step (for example, drilling or punching) with an indentation that is adapted to the shape of the second object or a protrusion thereof so that when the first and second objects are brought together for the purpose of pressing and coupling energy into the second object, the second object or a protrusion thereof is at least partially inserted into the indentation or is placed on a mouth of the indentation. In embodiments where a sealing and/or connection with sidewalls of the indentation is desired, the indentation is dimensioned to have a cross section slightly smaller than the second object/protrusion so that the first object material is slightly deformed elastically by the second object.

BRIEF DESCRIPTION OF THE DRAWINGS

In the following, ways to carry out the invention and embodiments are described referring to drawings. The drawings mostly are schematic. In the drawings, same reference numerals refer to same or analogous elements. The drawings show:

FIGS. 4-12 embodiments of second object shapes or shapes of features of second objects, as well as pressure and material flow considerations;

DESCRIPTION OF THE PREFERRED EMBODIMENTS

Figure 1:
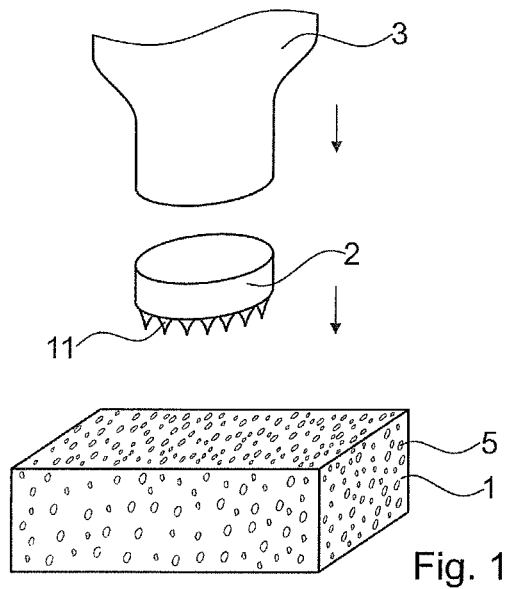
FIG. 1 a basic set-up.

FIG. 1 depicts a basic set-up of embodiments of the invention. The first object 1 is of a material that is at least partially cross-linked and is in an elastomeric state or can be brought into an elastomeric state by heating. The first object is, for example, of Polyurethane. In the depicted configuration, the first object is porous with a closed-pore structure and with a comparably low porosity of for example around 10% pore volume.

The second object 2 is thermoplastic. On one surface (lower surface in the orientation of FIG. 1; the bonding surface), the second object 2 has a plurality of piercing tips 11 or other features deviating from a generally flat surface. The surface opposed to the bonding surface is shaped as a coupling-in surface shaped to be adapted to a coupling-out surface of a sonotrode 3. Especially, in the depicted configuration this coupling-in surface is essentially flat. As an alternative it may have another shape adapted to the sonotrode; this includes, for example, a possible guiding indentation.

For the process, the surface of the second object that includes the piercing tips (or other features) is brought into contact with the first object. The sonotrode 3 presses the second object into the first object and couples vibration energy into the second object. Due to external and/or internal friction, mechanical energy is locally absorbed. Similarly to an ultrasonic welding process, the tips 11 therein function as energy directors defining the location where the absorption intensity is particularly high. By the common effect of their shape and the pressing force, potentially supported by the mechanical vibrations, the tips penetrate into the first object material (here: the PU), wherein this material will locally be cracked. Due to the effect of the heat generated in the second object, thermoplastic material of the second object will start to become flowable and flow into cracks generated by deformation of the first object material and—if present—laid-open pores of the first object.

The first object material will also be locally heated, potentially both, by heat conduction from the second object and by internal friction due to the local movements caused by the vibrations. The latter effect (absorption of mechanical energy within the first object material) is especially significant if/as soon as the first object material has elastomeric property and is above its glass transition temperature. As the local temperature of the first object material goes up in a vicinity of the interface to the first material, the first object material becomes more elastic there. By this, additional stress may be caused (and/or conserved stress may be released, as discussed hereinbefore). Also, the first object becomes better deformable, so that the geometrical shape is adjustable. Also crack healing effects may occur.

When a desired portion of the thermoplastic material is liquefied and/or when energy absorption in the second object becomes, due to a possible reduced friction because the first object material has become more elastic—too low to further liquefy substantial amounts of thermoplastic material, the transducer, by which the sonotrode is driven, is switched off Thereafter, the force by which the sonotrode presses the second object against the first object is maintained for some time until the first and second object materials are cooled to some extent.

After cooling, the second object is anchored in the first object by the interpenetration of thermoplastic material of the second object into structures of the first object. Such structures of the first object may by cracks that have arisen by the process of pressing the second object against the first object while the second object is subject to vibrational movement. Additionally, if available, the thermoplastic material may also fill structures already present in the object before the process, especially pores 5.

Figure 2:
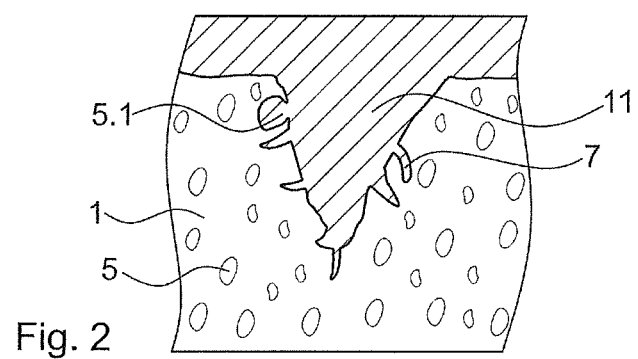
FIG. 2 an interface between the first and second objects after bonding.

FIG. 2 depicts a tip after the process. The figure illustrates thermoplastic material filling cracks 7 and thermoplastic material in a filled pore 5.1. As seen in FIG. 2, the interpenetration by the thermoplastic material causes undercut structures that create a positive-fit connection.

In addition, there may be an anchoring effect arising from the elastomeric properties of the first object. The first object material during the process due to its being heated gets locally relatively soft and pliable and adapts to the structure of the introduced features of the second object. Nevertheless, due to the fact that it is at least partially cross-linked, information on the original shape is not lost. After cooling, the modulus of elasticity will be increased again, and the local deformations introduced during the process will cause the material to be locally under stress. This may cause the first and second objects to be locally braced against each other—by the elastomeric second object material locally pressing against the surface of the first object. By appropriate geometrical measures—such as a macroscopic undercut, see below—this effect may be enhanced.

It has been observed that—depending on material properties and on the geometrical shape—the connection/bond between the first and second objects is weak or the second object is even repelled immediately after the turning off of the energy input. This may initially in part be explained by the fact that the liquefied thermoplastic material is not fully hardened immediately after the turning off of the energy source. In addition the enhanced pliability of the elastomeric first object material may ease a pulling away of the second object against the elastic force to be overcome due to the positive fit. The re-cooling 'freezes' the structure of the elastic material even though it may still be under stress. The pullout force is, as a consequence, enhanced. The after-pressure period may also be used to fine-adjust and/or correct the positioning of both objects secured.

Figure 3:
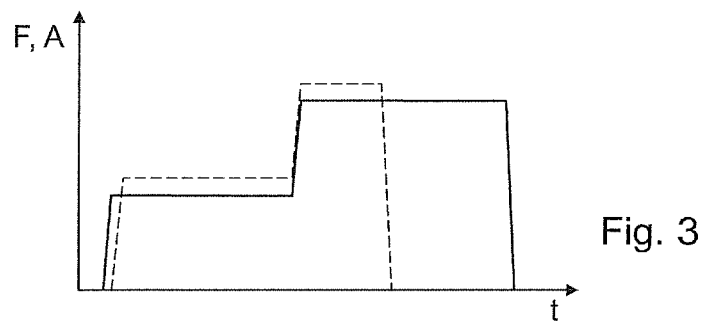
FIG. 3 the force and the vibration amplitude as a function of processing time for an example of a method according to the invention.

For a version of the process, FIG. 3 depicts, as a function of the time t, the applied pressing force F (solid line) and the amplitude A of the vibrations (or, equivalently, the power). In the depicted version, the following features may be observed:

A. The pressing force starts before the energy input, i.e. the second object is pressed against the first object before the vibrations start. Given an appropriate structure of the features of the second object, the first object surface may thereby be pierced before tips or edges of the second object are softened by the absorbed energy.

Alternatively to the depicted configuration, such initial pressing force before the energy input onset may also be chosen to be higher than the pressing force during the following process step.

B. Both, the pressing force and the amplitude are raised at some stage to yield a situation in which sufficient liquefied thermoplastic material is subject to sufficient hydrostatic pressure to penetrate into cracks and other structures of the first object material. In contrast to the depicted configuration, it would for example be possible to raise only the pressing force without raising the amplitude (or vice versa), or to raise the pressing force and amplitude at different points in time.

C. The pressing force is maintained after the energy inputs ends and until the connection is sufficiently stable. This phase of pressing without vibrating may be reduced or even avoided by appropriate geometrical shapes of the features of the second objects, as discussed further below.

The features A., B., and C. are all optional and implementable independently of one another and in any combination or variation. For example, it is possible to implement only feature A. (but to thereafter leave pressing force and/or amplitude constant and/or to stop pressing when the transducer is switched off), only feature C. (the vibrations are turned on when the pressing force starts, and both are then kept constant until the vibrations are turned off), only feature B., or arbitrary other combinations.

In other embodiments, different pressing-force-time and power-input-time dependencies may be chosen. More generally, pressing-force-time and power-input-time curves may be varied in a broad range, synchronized with each other or not.

Figure 4:
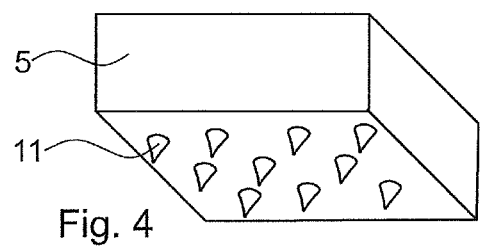

FIG. 4 depicts an example of a second object 2 consisting of thermoplastic material, which second object has a plurality of tips 11 on the bonding surface, the tips here being arranged in an array. The tips are concavely shaped with a pointed end suitable of piercing the first object.

Figure 5:
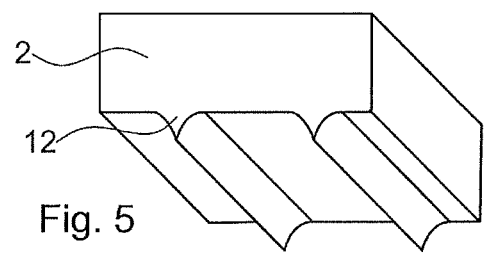

In the embodiment of FIG. 5, the second object has, instead of piercing tips, ridges 12. The edges formed by the ridges may optionally be sufficiently sharp of piercing the first object material. In the depicted configuration, the ridges have a concave surface. Other ridge shapes than straight ridges are also possible.

FIG. 6a yet shows the principle of a tube or sleeve connection between a first tube part of an at least partially cross-linked polymer (such as a slightly foamed PU) constituting the first object 1 and a second tube part of a thermoplastic (such as PE or PP) formed by the second object 2. FIG. 6a also depicts a sonotrode 3. A set-up as in FIG. 6a constitutes an example of a configuration where operation in a far-field mode (the distance between the sonotrode outcoupling surface and the liquefaction site corresponds to about a half wavelength or more) may be advantageous. The connection that arises after the bonding process at the interface between the first and second tube parts will, due to the approach according to the invention, be fluid-tight.

FIGS. 6b and 6c show variants of such a tube or sleeve connection, with only the region corresponding to the region illustrated in the dashed ellipse in FIG. 6a being shown.

In FIG. 6b, the second object is provided with a shoulder 17 that serves as a stop in the bonding process so that the relative axial position is well-defined.

In FIG. 6c, the second object has at its distal end a sleeve feature 18 that is put over the proximal end (rim) of the first tube 1 and that goes around the entire rim. In the bonding process, the protruding feature including the tips 11 or corresponding rims is pressed into the first object material and causes an expansion thereof so that the elastic material is slightly displaced near the rim, as illustrated by the double arrows. By this, the material is additionally pressed against the sleeve feature 18, and this yields and additional sealing effect, especially useful in situations where an inside of the connected tube may be expected to be under pressure during use.

A connection of the kind illustrated in FIGS. 6a-6c may, for example, be used to connect small vessels and/or liquid transport devices in medical technology, or to connect such vessels/devices with Luer fittings or similar.

Figure 7:
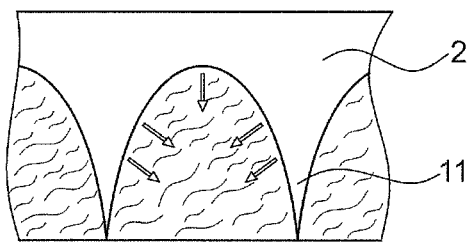

FIG. 7 illustrates how a concave shape of surface regions of the tips 11 or other features of the second object may contribute to the bonding. The pierced first object material 1 is pushed aside by the feature 11 as indicated by the double arrows. Because of the resilience intrinsic to the second object material this causes a counter force pressing the first object material against the second object. As a consequence, where the first object material has cracks or other structures (for example pores) and there is thermoplastic material, the cracks or other structures will be filled by the thermoplastic material, and this will result in a sound anchoring. In addition, the pressing of the resilient first object material against the second object surface yields an additional sealing.

Figure 8:
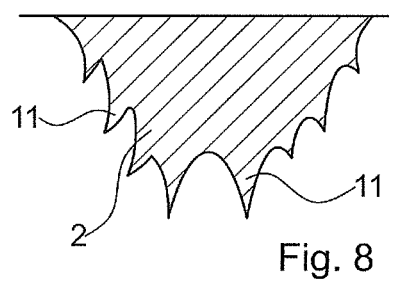

The embodiment of FIG. 8 has a plurality of tips 11, and an entire surface portion of the feature that penetrates into the first object material consists of the pointed ends or edges with concave portions between them. This brings about, after the pressing into the first object material, a continuous pressure profile, i.e. the first object material presses continuously against the surface.

Depending on the elastic properties and brittleness and tendency of cracks to propagate into the first object material (for example expressed in terms of a critical stress intensity factor K_{IC}), also other non-cylindrical shapes are feasible, depending on the material properties of the first object material. Also, pre-made indentations adapted to the process may be present in the first object material; then the shapes of the second object/second object protrusions may be chosen accordingly.

Figure 9:
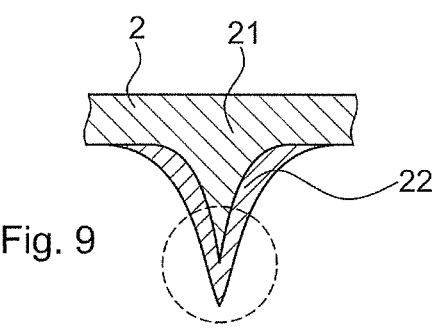

In all embodiments, the second object in addition to the thermoplastic material—that constitutes at least a part of the surface where the second object is pressed into the first object—may optionally comprise a constituent of a material not liquefiable under the conditions that are present during the bonding process. FIG. 9 illustrates an example thereof. The second object has a body 21 of a non-liquefiable material—for example a metal or a ceramics or a cured thermoset material—a plurality of tips or other structures with a coating of a thermoplastic material 22. During the bonding process—that is carried out as previously described for a second object consisting of the thermoplastic material—the thermoplastic coating is at least partially liquefied and may be displaced. Especially, a tip region (illustrated by the dashed circle) the thermoplastic material may be fully thrust aside by the movement of the feature 11 into the second material while the thermoplastic material is liquefied so that the core of the tip constituted by the body material is, at the region of the outer end of the feature, in direct contact with the first object material and may contribute to the piercing action.

Figure 10:
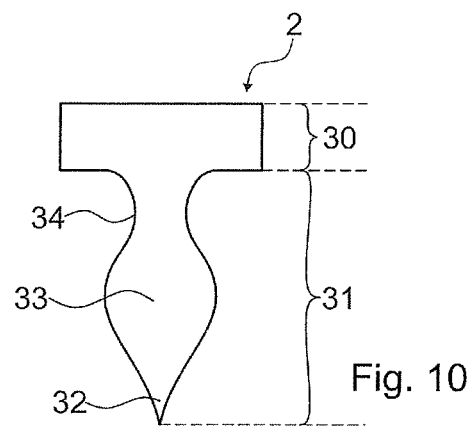

FIG. 10 yet shows an alternative shape of a protruding feature of the second object. The second object 2 shown in FIG. 10 has a feature region for being, during the bonding process, introduced into the first object material and resting embedded by the first object material, and a proximal abutment region 30. The feature 31 is approximately lance-shaped with a tip region 32 a broadening region 33 and a neck region 34. Due to the neck region proximally of the broadening region, a macroscopic undercut may be obtained that provides additional stability.

Elements with a neck region and a broadening region distally thereof may be viewed as an example of geometrical structures that cause expansion zones and compression zones next to each other in the first object material. Intrinsic shape memory properties of the polymers with elastomeric properties therein assist the anchoring process. As a rule of thumb, in such configurations the volume of displaced material corresponds to the volume of expansion. Also, the larger Young's modulus is, the less pronounced the capability of the material to be displaced/to expand and thus the smaller the displacement/expansion volumes and the closer they have to be to each other—in other words, the elasticity of the first object material determines the size of the geometrical structure of the second object—the larger the elasticity module, the smaller the structures, such as the lance-shaped structure.

Figure 11:
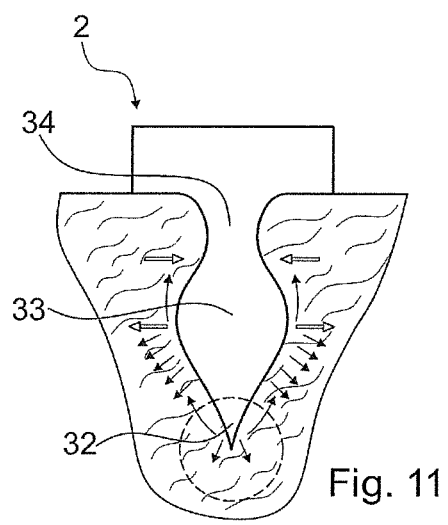

FIG. 11 illustrates the anchoring principle of the embodiment of FIG. 10 Thermoplastic material in the dashed regions will tend to be liquefied and displaced. The simple arrows show the potential flow of the thermoplastic material relative to the second object: the material on the one hand will be displaced towards the proximal region due to the relative movement. On the other hand, as soon as cracks or pores or other structures are present in the first object material, the local pressure will cause the thermoplastic material to be displaced outwardly into such structures. The double arrows show the displacement of the first object material. The broadening region 33 will displace the first object material—that is above its glass transition point during the process—outward. However, because the first object material is at least partially cross-linked the displaced material portions cannot flow away but will induce a stress on the neighboring regions. As a consequence, portions located more proximally (higher up in the configuration of FIG. 11) will be pressed radially inwards to be pressed against the neck region 34. This creates an undercut stabilizing the bond against a pulling out of the feature of the second object. After the energy input stops, the materials will cool down, and this will partially freeze the structure of the first object material even though it remains under stress. The stress remaining in the first object material in this embodiment and in other embodiments thus causes the first object and the second object to be locally braced against one another.

The shape of the kind shown in FIGS. 10 and 11 as well as the corresponding teaching are applicable both, to a single element ("dowel"), as well as to a geometrical basic characteristic of a second object of arbitrary shape, or as a geometrical characteristic of anchoring locations (piercing tips as in FIGS. 1, 4 or ridges as in FIG. 5).

Figure 12A:
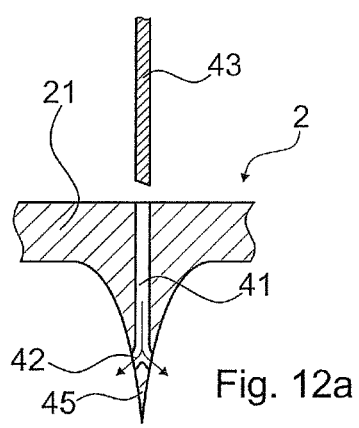

FIG. 12a yet shows an alternative embodiment of a second object 2. In contrast to the embodiment of FIG. 8, the thermoplastic material is not (or not only) present as a coating of body 21 of a non-liquefiable material. Instead, the body 21 defines a bore (or cannulation) 41 accessible from the proximal side (i.e., in the embodiment of FIG. 11, from the side facing away from the bonding side) from which bore one or more openings 42 open towards the bonding side.

Figure 12B:
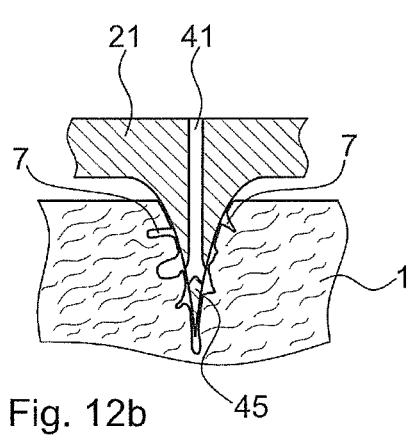

For the bonding process, in embodiments of this kind, the body 21 is pressed into the first object material, as illustrated in FIG. 12b. In the example illustrated in FIG. 12b, this causes cracks 7 extending into the first object.

Figure 12C:
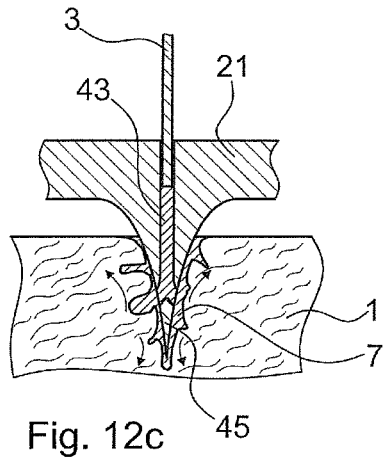

Then (or simultaneously with this), an element 43—that belongs to the second object but that may optionally be initially separate from the body 21—of the thermoplastic material is introduced into the bore from the proximal side and is pressed into the bore 41 while mechanical energy is coupled into the thermoplastic element 43 and while the body 21 is still being pressed into the first object material (FIG. 12c). The thermoplastic material is liquefied in contact with the body at the distal end of the bore 41, and liquefied portions are pressed out of the openings 42 into cracks 7, pores or other structures of the surrounding first object material. During this step of liquefying, the body 21 may be pressed further into the first object material to yield an extended region of first object material into which thermoplastic material has penetrated.

In embodiments of this kind, piercing features—such as the illustrated piercing tip 45—may be of a non-liquefiable material, for example of metal. This may be especially advantageous in situations where the first object material is tough and/or tenacious and difficult to penetrate.

Combinations of this approach with other shapes of the features that are pressed into the first object—for example features with an undercut as illustrated in FIG. 10 are possible.

Figure 13A:
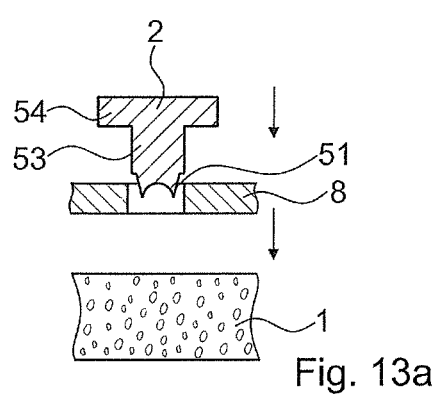
FIGS. 13a-13c the principle of fastening a third object to the first object using the second object as a connector.

FIG. 13a illustrates a principle of fastening a further, third object to the first object by the second object so that the second object 2 serves as a kind of connector. In the depicted embodiment, the third object 8 is depicted as a plate with a through-going opening 51. The second object has a shaft portion 53 that may include at least one tip or ridge or similar and may be viewed as a protruding feature of the above-discussed kind. The second object further has a head portion 54. For fastening the third object 8, the shaft portion is inserted through the opening and brought into contact against the surface of the first object, whereafter the herein-described bonding process is carried out. The head portion 54 serves as an abutment/stop when it abuts against the third object and secures the same against the first object. In this, due to the head portion a—macroscopic—positive-fit connection between the second and third objects results.

The effect of securing by a head portion 54 may be supplemented or replaced by a direct bond between the second and third objects. To this end, in FIG. 13b, the second object—that is assumed to be non-liquefiable, for example metallic—is provided with a structure 52 of open pores. In the process of pressing the second object against the first and third objects and coupling energy into the second object, thermoplastic material of the second object (of its head portion 54 if it is shaped as in FIG. 13a) is liquefied also in contact with the third object and penetrates into the open pore structure 52. After re-solidification, this yields a (micro-) positive-fit connection between the second and third objects.

Figure 13B:
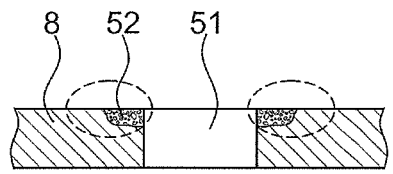
Figure 13C:
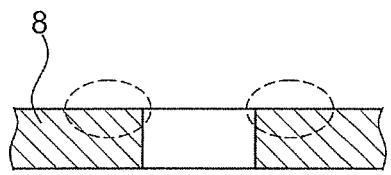

FIG. 13c yet shows a variant of a third object where the same is made of a thermoplastic material suitable to be welded to the thermoplastic material of the second object. In the region close to the rim (dashed regions), after absorption of vibration energy the second object may be ultrasonically welded to the third object.

For the embodiments of FIGS. 13b and 13c, the second object and/or the third object may additionally be provided with energy directing structures at their mutual interface.

In embodiments of the kind described referring to FIGS. 13a-13c, a head portion of the kind shown in the figures is not a requirement. Rather, other options for securing a third object exist. For example, a through-going opening and a corresponding portion of the second object may both be conical, or a slight press fit can exist between them. It would for example be possible to provide a cylindrical second object portion with an excess cross section (in relation to the opening) by energy directors, which second object portion then is welded to the third object or connected by a (micro-)positive fit connection with according structures of the third object.

Also for the process, it is not a requirement that a head define an abutment/stop; it would also be possible to define a stop by other means for a conical or cylindrical pin-shaped second object, such as external means, a stop defined by a conical portion, etc.

Of course, the embodiments described referring to FIGS. 13a-13c are not restricted to the depicted and described shapes of the second and third objects.

Figure 14:
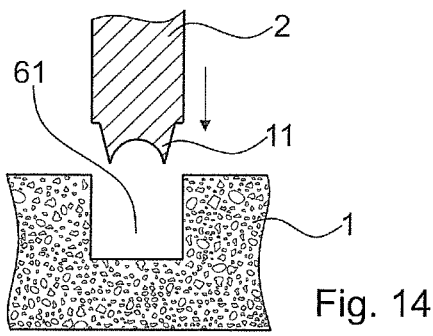
FIG. 14 an embodiment where the first object is provided, prior to the bonding, with an indentation adapted to the shape of the second object.

FIG. 14 yet shows an embodiment where the first object is provided with an indentation 62. This indentation may be manufactured in the original manufacturing (for example casting) process of the first object. Alternatively, it may be added in a subsequent processing step, for example by drilling or other material removing process.

The shape of the second object 2 or a protruding feature thereof is adapted to the shape of the indentation 61. In the depicted embodiment, the cross section/outer diameter of the second object's protruding feature is slightly larger than the cross section/diameter of the indentation so that the first object material will be pressed against the circumferential surface of the protruding feature. Also, one or both of the protruding feature and the indentation may be slightly conical. It would further be possible to provide the protruding feature (not shown in FIG. 14) with at least one protrusion at the periphery to yield an additional anchoring in the circumferential wall of the indentation.

Figure 15:
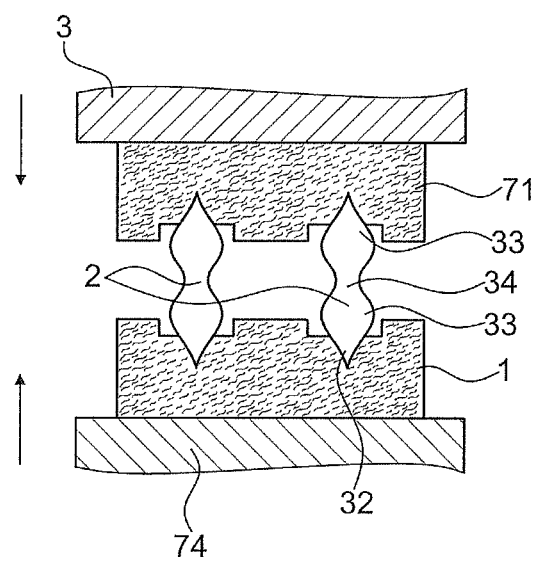
FIGS. 15-17 a configurations with mechanical energy being coupled into the second object indirectly.

FIG. 15 shows a configuration in which the energy, namely the vibration in the depicted configuration, is coupled indirectly into the second object 2, via a third object 71. In the shown embodiment, the third object is an object that has elastomeric properties, too. In this, for example, the third object has a glass transition temperature above the room temperature so that it is initially relatively stiff and capable of transmitting the mechanical vibrations from the sonotrode 3 to the second object 2 (in the figure, a plurality of second objects is illustrated) when the sonotrode 3 presses the arrangement against a support 74 while it vibrates. Under the effect of the pressure and energy, the second objects will be pressed both, into the first and third objects while portions of the second object material melts and is displaced.

The process of pressing and coupling energy into the arrangement may optionally continue until the first and third objects rest against each other, so that the second objects may be completely inside the thus manufactured element and serve as hidden connectors.

The support 74 may be von-vibrating or, alternatively, may vibrate and be itself a sonotrode so that the first object serves also as "third object" in the sense of the above description and vice versa.

The configuration of FIG. 15 may be altered in several ways. In accordance with a first possibility, the third object may be of a material that does not exhibit elastomeric properties under the manufacturing conditions. For example, the third object may be of a material (metal, hard plastics, ceramics etc.) that transmits mechanical vibrations and does not undergo a transition when heated to the melting temperature of the second object thermoplastic material.

Figure 16:
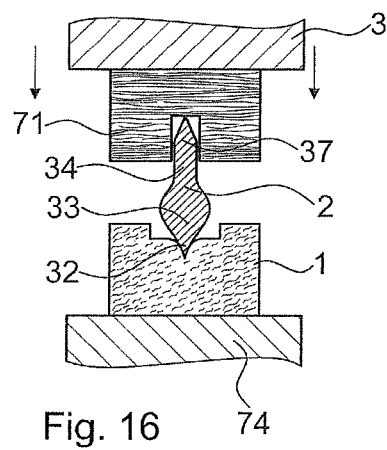

Instead, the third object may have an opening with an undercut into which thermoplastic material of the second flows when being melted during the process so that after re-solidification the second object is connected to the first object by a positive-fit connection As a further alternative, the third object material may be of a kind that has an open porous structure and/or in which liquefied thermoplastic may penetrate when subject to a hydrostatic pressure, for example as described in WO 98/42988 and WO 00/79137. FIG. 16 shows an example of such a configuration where the third object 71 is made of a wood-based material (such as wood or a wood composite). The wood-based material of the third object is interpenetrated by thermoplastic material of the second object when this material is in a liquid state.

The second object includes, in the illustrated embodiment, a tip-shaped proximal end portion 37 that may serve as a kind of energy director.

Figure 17:
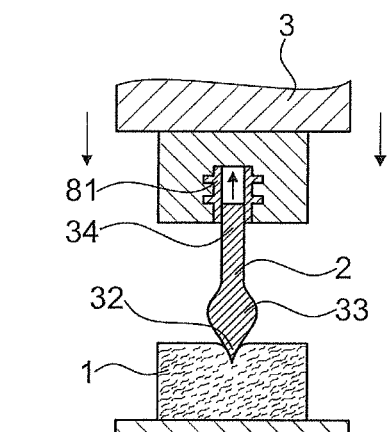

FIG. 17 depicts a configuration in which the third object 71 has thermoplastic material portions 71, which, during the process, weld to thermoplastic material of the second object 2.

Figure 18:
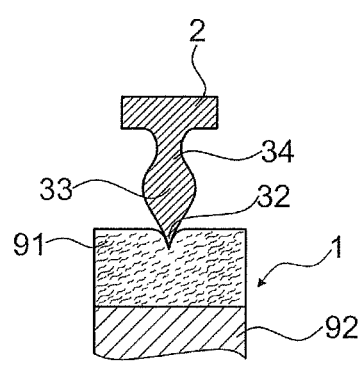
FIG. 18 a configuration for a bonding combined with welding.

FIG. 18 shows a first object 1 of a layered composition. A first layer 91 includes the at least partially cross-linked polymer or pre-polymer with elastomeric properties. A second layer 92 is of a thermoplastic material. When the second object 2—here illustrated with a shape similar to FIG. 10, but the teaching applies to other shapes as well—is pressed into the first object under the effect of mechanical vibrations, two effects contribute to the bonding:

Firstly, the second object is anchored in the first layer 91 of the first object in the manner described hereinbefore by second object material interpenetrating crack, pores and/or deformations of the first object material and possibly by displacement of first object material as described referring to FIG. 11.

Secondly, the second object is anchored in the first object by being welded to the second layer 92.

In addition to contributing to the bond, the weld between first object material and second object material provides a sealing effect, which may be advantageous in configurations, especially if the first layer 91 is of a material with open pores or if otherwise the sealing between the first layer material and the second object material would not suffice for a purpose of an application.

Similarly, it would also be possible to provide such a second layer, instead of a weldable thermoplastic polymer, with a material and/or structures capable of being interpenetrated by thermoplastic material in a process as described in WO 98/42988 and WO 00/79137. In addition or as an alternative, it would be possible to provide a second material with a (macroscopic) cavity having an undercut that may be filled by the thermoplastic material.

In the embodiment described referring to FIG. 10, the sequence of the two layers 91, 92 may be reversed. In addition or as an alternative, further layers may be present. Also, it would be possible to provide the different material portions not in layers but in other geometrical arrangements.

In the embodiment of FIGS. 15-18, the second objects have lance-shaped portions, and in the first (and third, if applicable) objects, effects similar to the ones illustrated referring to FIG. 11 may occur. However, it would also be possible to use second objects with other shapes, for example as illustrated referring to FIGS. 1-9. Further, in all these embodiments a different number of second objects, i.e. one, two, three, or more second objects could be used.

Example

A first object consisting of a PU foam with closed pores having an overall pore volume of about 10% and a second object of PP with a serrated bonding surface where used. The second object had an overall rectangular shape with a size of about 10×20×4 mm, with one of the large surfaces defining the bonding surface. The bonding surface of the PP comprised a plurality of parallel ridges having a height of about 1.5 mm and a distance of about 2.5 mm. The PP part was pressed against the surface of the first object by a flat sonotrode connected to a Telsonic USP 3000 Ultrasound machine operating at 20 kHz, with a maximum power of 3 kW. The pressing force was chosen to be between 300 and 450 N, and the amplitude between 50 and 60 p.m. With these parameters, the arrangement is operated in the near-field mode. The pressure and vibrations were applied until the PU foam locally was in an elastic state. Then, the machine was turned off and the pressing force was maintained for a further about 20 s. A sound connection withstanding pulling forces of around 1.5 N/mm² bonding surface resulted. When the objects were dismantled from each other, it could be shown that the PP had been liquefied at the outer surface and enveloped PU foam structures. It was not possible to remove the PP object without breaking away parts of the PU foam.

Scanning electron microscopy pictures confirmed that at the interface to the PP object, small cracks had been created in the PU material, which cracks were filled by PP material. The PP also filled some of the pores.

In additional experiments with second objects formed comparably to FIGS. 6a and 6b, it was found that the connection was fluid-tight and withstood both, water and air pressure up to a maximum pressure that depended on the initial shape of the second object.

Various other embodiments may be envisaged without departing from the scope and spirit of the invention.

What is claimed is:

1. A method of bonding a second object to a first object, the method comprising the steps of
providing the first object comprising a first object material comprising an at least partially cross-linked polymer or pre-polymer;
providing the second object comprising a thermoplastic material;
pressing the second object against the first object and coupling energy into the second object until the thermoplastic material is at least partially liquefied, and until the thermoplastic material is caused to penetrate into at least one of cracks, pores and deformations of the first object material, while the first object material is above its glass transition temperature at least in a vicinity of said cracks, pores or deformations into which thermoplastic material penetrates; and
letting the thermoplastic material re-solidify.

2. The method according to claim 1, wherein the first object material is porous.

3. The method according to claim 1, wherein the first object material further comprises a non-polymeric filler.

4. The method according to claim 1, wherein the first object consist of the first object material.

5. The method according to claim 1, wherein the first object comprises portions of the first object material and further comprises portions of further material, wherein the portions of the further material are weldable to the thermoplastic polymer or are capable of being interpenetrated by the thermoplastic polymer in a manner that after re-solidification of the thermoplastic polymer a positive fit connection results.

6. The method according to claim 1, wherein for a glass transition temperature $T_{G,1}$ and a temperature $T_{fl,2}$ above which the thermoplastic material is flowable, the relation $T_{fl,2} > T_{G,1}$ holds.

7. The method according to claim 1, wherein the first object material and the thermoplastic material are chosen so that firstly either the first object material is not meltable or the first object material is meltable but not miscible with the thermoplastic material and so that secondly they do not undergo any chemical bonding when brought in contact with each other at room temperature or a temperature $T_{fl,2}$ above which the thermoplastic material is flowable.

8. The method according to claim 1, wherein the energy coupled into the second object is mechanical vibration energy.

9. The method according to claim 8, wherein in the steps of pressing and coupling energy into the second object, the second element is compressed between a sonotrode and the first object.

10. The method according to claim 8, wherein the first object material during the step of coupling energy into the second element absorbs energy due to internal friction.

11. The method according to claim 1, wherein the first object material is chosen so that after the steps of pressing and coupling energy into the second element, the first object material remains under internal stress.

12. The method according to claim 1, wherein the second object comprises a bonding surface that is, prior to the steps of pressing and coupling energy into the second element, brought into contact with a corresponding surface portion of the first object, and wherein the bonding surface comprises at least one protruding feature.

13. The method according to claim 12, wherein the at least one protruding feature comprises at least one tip or ridge.

14. The method according to claim 13, wherein the at least one protruding feature prior in the step of pressing is caused to be driven through the corresponding surface portion of the first object.

15. The method according to claim 1, wherein during the step of pressing at least one portion of the second object is caused to penetrate into the first object material in a manner that the first object material is locally ruptured.

16. The method according to claim 15, wherein a surface portion of the second object is pointed and concave.

17. The method according to claim 15, wherein the second object or a protruding feature thereof comprises a broadened portion and, proximally of the broadened feature, a neck portion with a radial extension that is smaller than a corresponding radial extension of the broadened portion at least in one direction.

18. The method according to claim 1, wherein after the step of coupling energy into the second object, the step of pressing is continued during an after-pressure period.

19. The method according to claim 1, wherein the second object comprises a body of a non-liquefiable material and a portion of the thermoplastic material.

20. The method according to claim 19, wherein the body constitutes a core that is at least partially coated by the thermoplastic material.

21. The method according to claim 19, wherein the body comprises a bore open to the proximal side and at least one opening to the bonding surface, the second object further comprising at least one element of the thermoplastic material, wherein the element is inserted in the bonding surface and the energy during the step of coupling energy into the second object, is coupled at least partially into the thermoplastic element.

22. The method according to claim 1, wherein during the step of coupling energy into the second object, the first object is caused to be further cross-linked at least locally.

23. The method according to claim 1, wherein the first object material maintains a shape memory during the step of coupling energy into the second object.

24. The method according to claim 1, wherein the step of pressing sets in prior to the step of coupling energy into the second object.

25. The method according to claim 1, wherein the step of pressing sets in simultaneously with the step of coupling energy into the second object.

26. The method according to claim 1, wherein the step of pressing comprises the sub steps of initially pressing with a first pressing force and subsequently pressing with a second, higher pressing force.

27. The method according to claim 1, comprising the further steps of providing a third object and of fastening the third object to the first object by the second object.

28. The method according to claim 27, wherein the third object is fastened by a positive-fit connection.

29. The method according to claim 27, wherein in the steps of pressing and coupling energy into the second object, thermoplastic material of the second object is liquefied at an interface between the second and third objects.

30. The method according to claim 29, wherein the thermoplastic material of the second object that is liquefied at an interface between the second and third objects is caused to interpenetrate structures of the third object to yield a positive-fit connection.

31. The method according to claim 29, wherein the third object comprises a thermoplastic region that is welded to thermoplastic material of the second object.

32. The method according to claim 1, wherein the first object comprises an indentation and the second object has a shape adapted to the indentation.

* * * * *